(12) United States Patent
Misch et al.

(10) Patent No.: US 10,761,814 B2
(45) Date of Patent: Sep. 1, 2020

(54) METHOD AND SYSTEM FOR VISUALIZING A BLOCK DIAGRAM

(71) Applicant: dSPACE digital signal processing and control engineering GmbH, Paderborn (DE)

(72) Inventors: Thomas Misch, Paderborn (DE); Renate Loeffler, Paderborn (DE); Joe Varghese, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 156 days.

(21) Appl. No.: 16/190,729

(22) Filed: Nov. 14, 2018

(65) Prior Publication Data

US 2020/0150932 A1    May 14, 2020

(51) Int. Cl.
*G06F 8/35* (2018.01)
*G06F 8/34* (2018.01)
*G06T 11/60* (2006.01)
*G06F 3/0484* (2013.01)

(52) U.S. Cl.
CPC .................. *G06F 8/35* (2013.01); *G06F 8/34* (2013.01); *G06T 11/60* (2013.01); *G06F 3/04845* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 2007/0120576 A1* | 5/2007 | Ford, III | ................ | G06T 19/20 326/41 |
| 2009/0327942 A1* | 12/2009 | Eldridge | ................. | G06F 30/30 715/771 |
| 2012/0290955 A1* | 11/2012 | Quine | ....................... | G06F 8/34 715/763 |
| 2013/0116986 A1* | 5/2013 | Zhang | .................... | G06F 30/20 703/2 |
| 2015/0006135 A1* | 1/2015 | Deb | ....................... | G06T 11/60 703/6 |
| 2017/0351492 A1* | 12/2017 | Szpak | ................... | G06F 30/367 |
| 2019/0163449 A1* | 5/2019 | Hein | ........................ | G06F 8/33 |
| 2019/0258460 A1* | 8/2019 | Schlachter | ............... | G06F 8/35 |
| 2019/0294421 A1* | 9/2019 | Pietzsch | .................. | G06F 8/20 |

FOREIGN PATENT DOCUMENTS

WO    WO-2015196788 A1 * 12/2015    ............... G06F 9/44

* cited by examiner

*Primary Examiner* — Isaac T Tecklu

(74) *Attorney, Agent, or Firm* — Muncy, Geissler, Olds & Lowe, P.C.

(57) ABSTRACT

A method for visualizing system models in a model management environment, which includes the steps of opening the system model in the model editor, receiving a user input for rescaling a block, determining a relative horizontal position and a relative vertical position for each port in the block, calculating a new absolute horizontal and vertical position of each port in the block based on the relative horizontal and vertical position and the new size preset for the block, and displaying the block and each port in the block.

13 Claims, 4 Drawing Sheets

METHOD AND SYSTEM FOR VISUALIZING A BLOCK DIAGRAM

BACKGROUND OF THE INVENTION

Field of the Invention

The present invention relates to methods and computer systems for managing block diagrams defining software programs; in particular, it relates to the visualization of block diagrams

Description of the Background Art

Electronic control units (ECUs) are ubiquitous especially in automotive applications; generally, they may contain a processor, in particular a microcontroller, one or more sensor interfaces and one or more circuits to control an actuator. Current parameters of a physical process may be determined using the signals of the one or more sensors connected to the sensor interfaces, and based on a predefined control strategy, the processor may control the one or more circuits to apply the actuators in order to influence the physical process. Modern microcontrollers allow for increasingly complex control strategies as well as for running multiple programs on a single ECU. In order to manage this increased complexity, software frameworks such as AUTOSAR have been defined for the development of ECU software, where prior to implementing the actual control strategy or desired behavior, an architecture of the software is specified. The architecture may comprise software components, subcomponents and interfaces of software components. Messaging between different software components may be performed via a runtime environment (RTE) adapted to the defined architecture.

Control strategies are preferably implemented using block diagrams in a behavior-modeling tool that may comprise a technical computing environment (TCE) allowing for tracing the temporal behavior of a physical system described by blocks in the block diagram. The document "Production Quality Code Generation from Simulink Block Diagrams", Proceedings of the 1999 IEEE International Symposium on Computer Aided Control System Design, Kohala-Coast, Hawai'i, USA, by H. Hanselmann et al. describes a behavior-modeling tool that allows for automatically generating production code based on a block diagram containing one or more blocks that specify the behavior of a program.

For ECU software comprising more than a single software component, keeping track of a plurality of partial models in a plurality of variants quickly becomes cumbersome. This problem is aggravated when one behavior-modeling tool is used for implementing a first software component, and a different behavior-modeling tool is used for implementing a second software component. Further, the person defining the architecture and/or integrating the different software components does not need (or want) to know details of the implementation, but only the interfaces between different model parts, in particular signals and/or ports.

Thus, improved methods for managing the properties of software components are desired, in particular an efficient and well-arranged visualization of system models comprising a plurality of ports.

SUMMARY OF THE INVENTION

It is therefore an object of the present invention to provide a method and a computer system for visualizing software programs as block diagrams.

In an exemplary embodiment of the invention, a computer-implemented method for visualizing system models in a model management environment is provided, wherein a system model comprises one or more blocks, wherein blocks comprise ports, wherein ports are connected by signals, the model management environment comprising a database and a model editor, the model management environment being executed by at least one processor of a host computer, the method comprising the steps of: opening the system model in the model editor, wherein opening the model comprises determining a size and a position for each block and drawing each block in the model editor based on the determined size and position; receiving a user input for rescaling a block, wherein receiving the user input for rescaling comprises determining a new size preset; determining a relative horizontal position and a relative vertical position for each port in the block, the relative horizontal position being dependent upon the distances of a defined point in the port, such as the center or the top left corner, to the left border and/or the right border, and the relative vertical position being dependent upon the distance of the defined point in the port from the upper border and/or the lower border; calculating a new absolute horizontal and vertical position of each port in the block based on the relative horizontal and vertical position and the new size preset for the block; and/or displaying the block and each port in the block.

Receiving a user input for rescaling a block may comprise detecting a mouse click of the user on a corner of a block followed by a movement of the mouse while keeping the mouse button pressed. A new size preset for the block can be determined based on the changed position of the chosen corner. Ports may be assigned a surrounding rectangle and a small complex shaped front pattern that could also change for different ports. The defined point for determining the relative horizontal and vertical position may be anywhere on the surrounding rectangle, as long as it is consistently chosen for all ports.

Advantageously, the inventive method keeps the ports of a model in a well-defined spatial relation to another and thus allows for quickly grasping the main characteristics of a model or architecture.

At least one block can be assigned at least one repulsive region, in particular one repulsive region in each corner of the block, and any port whose calculated new absolute horizontal and vertical position lies in a repulsive region is moved to the border of the repulsive region. By defining repulsive regions, placement of the ports in a resized block can be more finely adapted. The absolute size of a repulsive region may be fixed. A block can have four repulsive regions, one in each corner of the block. A repulsive region located in a corner of the block can have square dimensions. The direction of the repulsion in a corner repulsive region may be determined based on if the port position protrudes more in the horizontal or in the vertical direction, for example, by verifying if the intended position of the port is above or below the diagonal, i.e. the connection between the corner and the center of the block. For a top left repulsive region, when an intended position is below the diagonal, the port can be moved to the lower border of the repulsive region.

At least one block can be assigned a border region; the border region comprising an area up to defined distance from the border of a block, wherein for any port located in the border region, the absolute distance to the closest border is kept fixed. If a repulsive region is defined for the block, any overlap between repulsive region and border region can be cut out of the border region. In an upper border and a lower border region, the horizontal relative position is preserved, whereas in a left border region and a right border region, the vertical relative position is preserved. Border regions may be used as interface areas comprising many ports.

The distance defining the border region can be kept fixed irrespective of block size, and for a block comprising a border region, any port not located in the border region is kept out of the border region after rescaling. When keeping a port out of a border region results in an overlap between two adjacent ports, the size of the block may be enlarged to a minimum size determined based on the number of ports in the block and/or at least one port position may be adjusted so that the distance between the ports is kept above a predefined threshold.

The processor can define a minimum size for the block, and keeps the size of the block at or above the minimum size when rescaling. The minimum size for the block may be determined based on the number of ports in the block. For instance, the minimum height of a block may be determined by assigning each port a fixed height and adding up the corresponding values; an additional fixed height may be added for a repulsive region. The width of the block may subsequently be calculated from the minimum height and the current aspect ratio of the block.

Thus, two adjacent ports may be kept from overlapping by defining a minimum size for the block.

Two adjacent ports can be kept from overlapping by determining if the distance between two adjacent ports would fall below a predefined minimum value after rescaling, and in that case adjusting the absolute positions while storing the determined relative positions for a possible future rescaling.

Model visualization presets, such as size presets for the blocks, can be stored in files, and features important for displaying the model are stored in the file as additional elements or tags. The files may be stored in a database or in a file system of the host computer.

A predefined snap-in position can be defined for inserting a new port or changing the position of an existing port. When a new or moved port is to be placed, and the mouse pointer is in an acceptance region around the snap-in position, the position of the port is set to the snap-in position.

A graphical element, such as a point or a rectangle, can be defined as a port anchor, and the snap-in position is located at a predefined distance from the port anchor.

Information areas can be defined in the file, and additional information are displayed to the user when a pointer is positioned in the information area of the model displayed in the model editor. Thus, the system model is kept clearly laid out, as only little information is displayed by default, but details such as parameters can easily be viewed by the user.

One aspect of the invention also concerns a non-transitory computer readable medium containing instructions that, when executed by a microprocessor of a computer system, cause the computer system to carry out the inventive method as described above.

A computer system is also provided which comprises a processor, a random access memory, a graphics controller connected to a display, a serial interface connected to at least one human input device, and a nonvolatile memory, in particular a hard disk or a solid-state disk. The nonvolatile memory comprises instructions that, when executed by the processor, cause the computer system to carry out the inventive method. The processor may be a general-purpose microprocessor that is customary used as the central processing unit of a personal computer or it may comprise one or a plurality of processing elements adapted for carrying out specific calculations, such as a graphics-processing unit. In alternative embodiments of the invention, the processor may be replaced or complemented by a programmable logic device, such as a field-programmable gate array, which is configured to provide a defined set of operations and/or may comprise an IP core microprocessor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
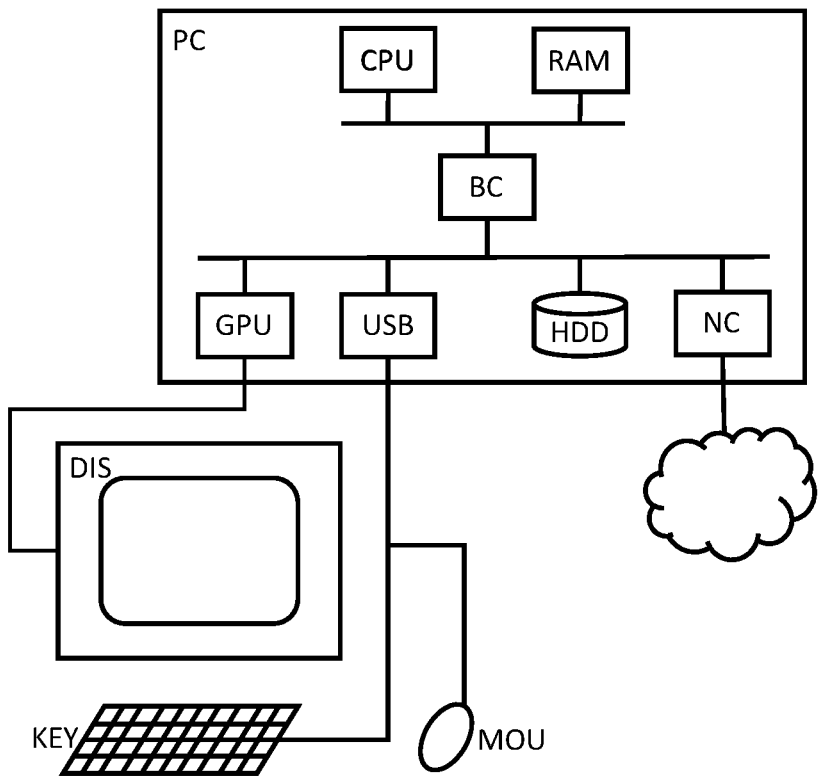
FIG. 1 is an exemplary diagram of a computer system.

FIG. 1 illustrates an exemplary embodiment of a computer system. The shown embodiment comprises a host computer PC with a display DIS and human interface devices such as a keyboard KEY and a mouse MOU.

The host computer PC comprises at least one processor CPU with one or multiple cores, a random access memory RAM and a number of devices connected to a local bus (such as PCI Express), which exchanges data with the CPU via a bus controller BC. The devices comprise e.g. a graphics-processing unit GPU for driving the display, a controller USB for attaching peripherals, a non-volatile memory HDD such as a hard disk or a solid-state disk, and a network interface NC. The non-volatile memory can comprise instructions that, when executed by one or more cores of the processor CPU, cause the computer system to carry out a method according to one of the claims.

The host computer may comprise one or more servers, suggested by a stylized cloud in the figure, comprising one or more processing elements, the servers being connected to a client comprising a display device and an input device via a network. Thus, the technical computing environment may be executed partially or completely on a remote server, such as in a cloud computing setup. A personal computer may be used as a client comprising a display device and an input device via a network. Alternatively, a graphical user interface of the technical computing environment may be displayed on a portable computing device, in particular a portable computing device with a touch screen interface.

Figure 2:
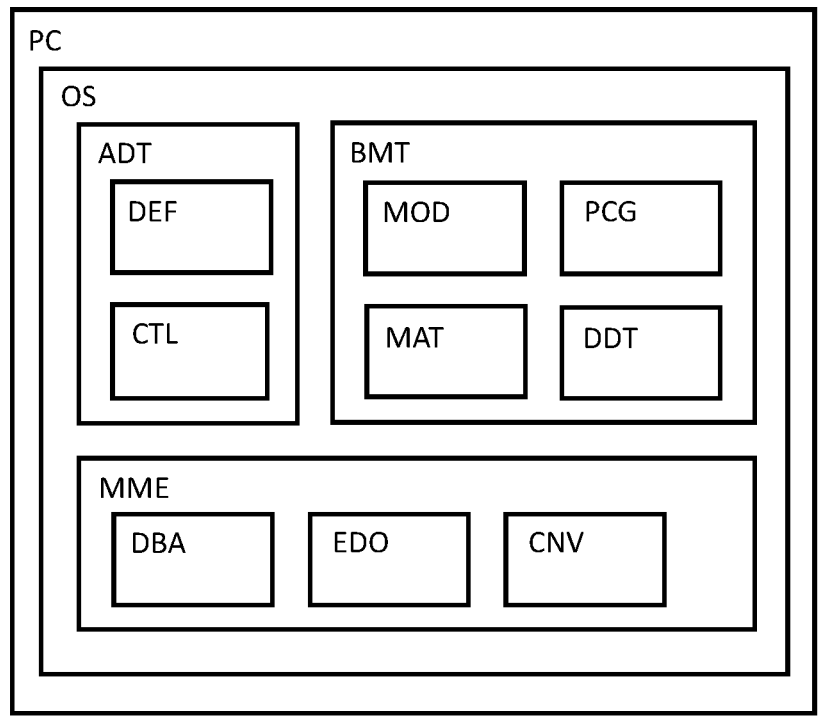
FIG. 2 is an exemplary diagram of software on a computer system.

FIG. 2 displays an exemplary embodiment of the software being executed on the computer system, which may be realized as a host computer PC with a standard microprocessor that runs a standard operating system OS such as Microsoft Windows or a Linux distribution. On the host computer PC, an architecture definition tool ADT, a behavior-modeling tool BMT and a model management environment MME are installed.

The architecture definition tool ADT comprises a definition environment DEF. The definition environment DEF can comprises a graphical user interface for defining and modifying the software architecture. In addition, it may comprise a user interface for defining a hardware architecture comprising one or multiple ECUs and/or a user interface for deploying different elements of the software architecture on the ECUs of the hardware architecture. Additionally, the architecture definition tool comprises a control tool CTL that allows for importing and/or exporting one or more elements of the software architecture, in particular an entire software component definition. An exemplary architecture definition tool is System Desk of dSPACE.

The behavior-modeling tool BMT may be based on a technical computing environment (such as MATLAB/Simulink of The MathWorks) that comprises a plurality of software components such as a modeling environment MOD for modifying block diagrams and/or a script interpreter MAT that is adapted for carrying out calculations or modifying data. Additionally, a simulation engine for executing block diagrams may be part of the BMT. The BMT comprises a production code generator PCG that is adapted to create production code from one or more blocks in the block diagram. Production code may be optimized and/or customized according to a plurality of options such as target-specific optimizations for a processor or compliance to a language standard; an exemplary production code generator PCG is TargetLink of dSPACE. The BMT further comprises a data definition tool DDT that may provide data for a specific block diagram such as definitions and parameters and an application-programming interface for automatic exchange of the data. A data definition tool allows for a clean separation of the model of the dynamic system given in the block diagram from implementation-specific details. By exchanging data with other programs such as the model management environment, the data definition tool DDT can be used as part of a higher-level tool chain, in particular to generate product code compliant to the AUTOSAR standard.

The model management environment MME comprises a database DBA, a model editor EDO and one or more converters CNV for exchanging data with other programs such as the architecture definition tool and/or the behavior-modeling tool. The model editor EDO will be described in more detail below. The database DBA may be based on any general-purpose database application, the structure preferably being adapted to manage models and/or test models. The database may comprise a version control or may comprise an interface to a version control system. Preferably, it is specially adapted to manage multiple implementation variants of a model. The model management environment MME may comprise a plurality of dedicated convert adapted to import data from and/or export data to a specific architecture definition tool or a specific behavior-modeling tool as well as a customizable general-purpose converter using standard format such as XML. Additionally, a converter may be specially adapted to generate structure definitions for a simulated ECU, for example, according to the functional mockup interface (FMI); these may be used in creating virtual electronic control units for simulation purposes.

Other software components such as a production code compiler may be installed on the computer. These software components may be interfaced to each other, the architecture definition tool, the behavior-modeling tool or the model management environment using standard mechanisms of the underlying operating system OS.

Figure 3:
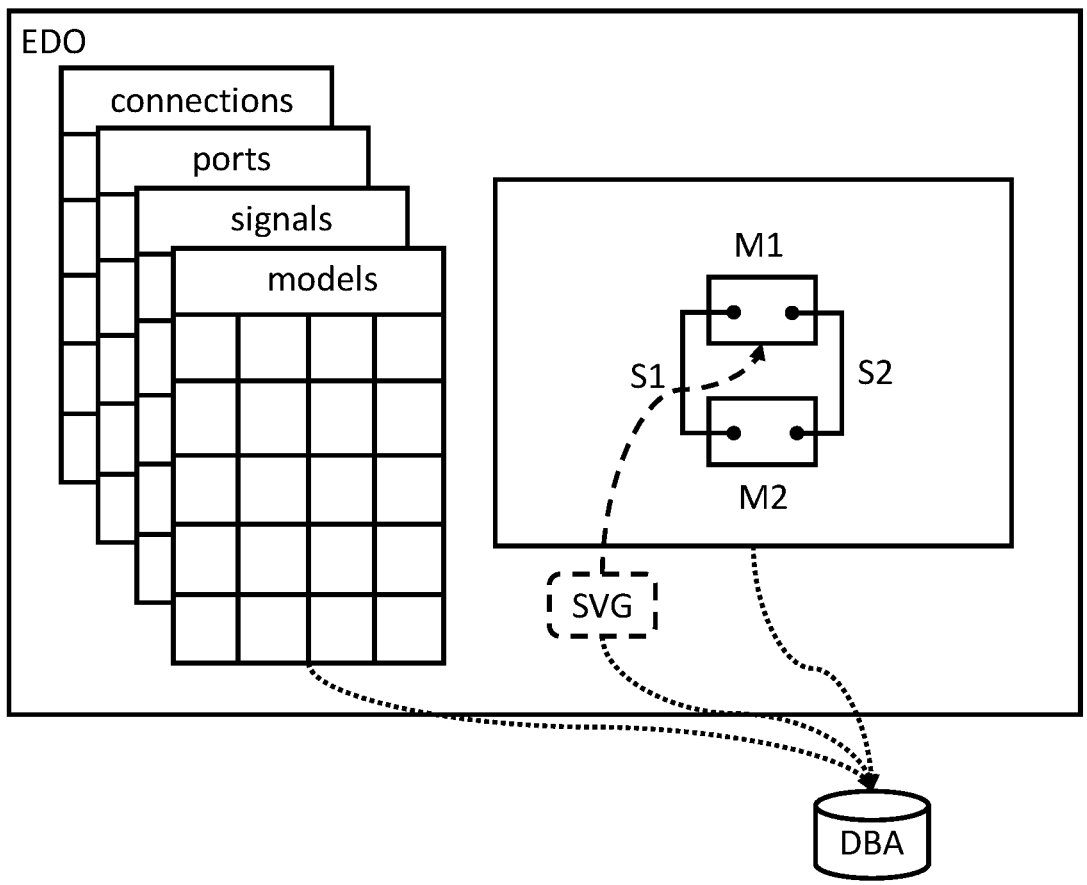
FIG. 3 is an exemplary diagram of a model management system.

FIG. 3 illustrates an exemplary diagram of a graphical user interface for a model management environment comprising a model editor EDO and a database DBA.

The model editor EDO may comprise a tabular view, indicated by four schematic tables to the left, and a graphical model view, indicated on the right. Models may be reused in different projects, and a model may comprise a plurality of sub-models. The model editor EDO is adapted to view and modify the connections between different (sub-)models. A first table "connections" may list all present connections and different properties of the connections. A second table "ports" may list all the ports present in a model and the corresponding properties of the ports. A third table "signals" may list all the signals that are exchanged via the different connections of the (sub-)models and the signal properties, e.g. relevant for the interpretation of the respective signal. A fourth table "models" may list the different sub-models and their properties. No details on how the functionality of a model is implemented needs to be present in the model management system; as a result, models from different behavior-modeling tools may be managed uniformly.

While the tabular view may be suitable for checking and adapting specific details, drawing signals/connections between different (sub-)models visible in the graphical model view is much more comfortable for the user. In the exemplary view, a first (sub-)model M1 and a second (sub-)model M2 are shown; they are interconnected by a signal S1 and a signal S2. The structure of the integration model can be grasped at a glance. Details for displaying a particular (sub-)model may be assigned as additional information, for instance in a "SVG" file, indicated by a dashed line. The SVG file may comprise port anchors that the user may use when placing additional ports (if he chooses to use them). Once a SVG file has been defined for a model, it may be used in any instance that the model is referenced in an integration model comprising multiple sub-models.

The tables of the tabular view as well as display information for the graphical model view may be stored in the database DBA, as indicated by dotted arrows.

Figure 4:
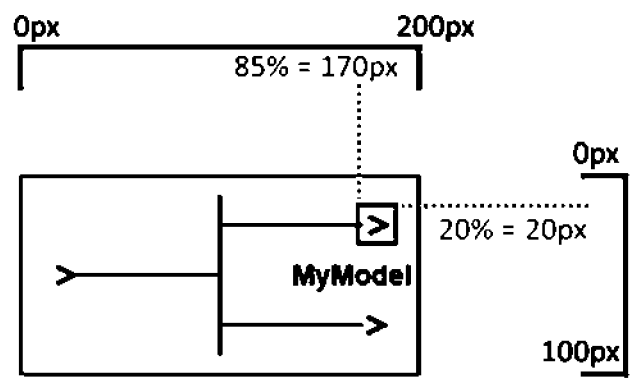
FIG. 4 is an exemplary view of a block indicating a relative and absolute position of a port.

FIG. 4 shows an exemplary view of a block indicating a relative and absolute position of a port.

The block comprises one input port, shown as an arrow tip in the left half of the block, and two output ports, shown as arrow tips in the right half of the block. The ports are connected by a signal line. For the upper output port, an outer dimension is indicated by a square surrounding the arrow tip. The dimensions of the block are indicated by a scale above and a scale to the right of the block. The width of the block is 200 px (=pixels) and the height is 100 px (=pixels), i.e. the block has an aspect ratio of 2:1.

In the shown example, the top left border of a port is used as reference point for determining the relative position of the port in the block. Generally, any point of the port may be used as reference point, as long as the choice is consistent for all ports.

Figure 5:
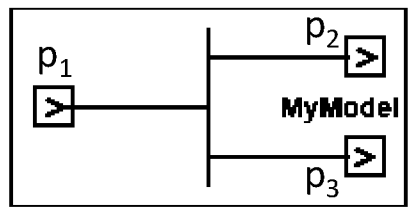
FIG. 5 is an exemplary view of a block in a first size.

FIG. 5 displays an exemplary view of a block in a first size, the block representing a model in the graphical model view.

The block comprises one input port $p_1$ and two output ports $p_2$, $p_3$. In the graphical model view, a name of the block such as "MyModel" may be shown.

Figure 6:
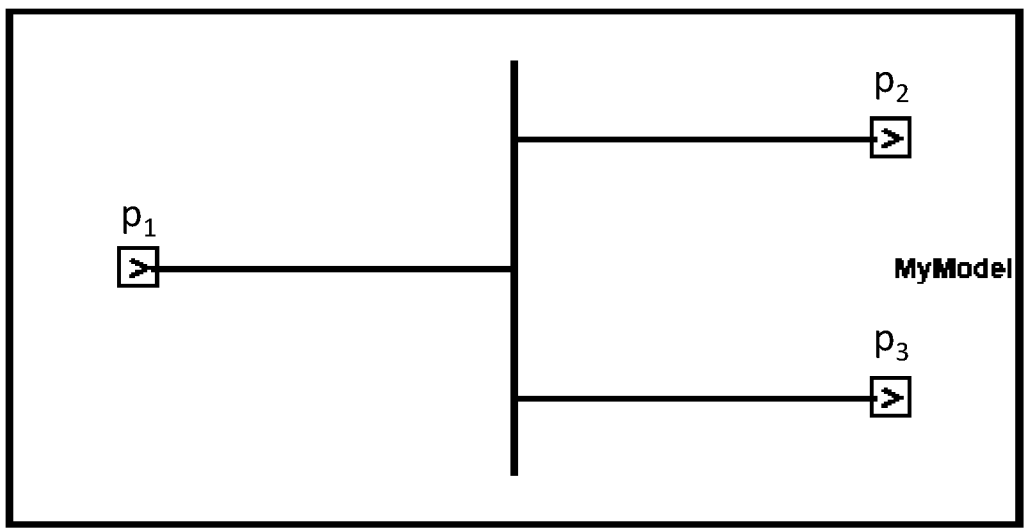
FIG. 6 is an exemplary view of a block in a second size.

FIG. 6 illustrates an exemplary view of a block in a second size. The model is a magnified version of the model in FIG. 5.

The absolute positions of the input port $p_1$ and the output ports $p_2$, $p_3$ have been rescaled based on the determined relative positions. As a result, the layout of the resized block stays correct, so that a user can quickly get an overview of the model.

Figure 7:
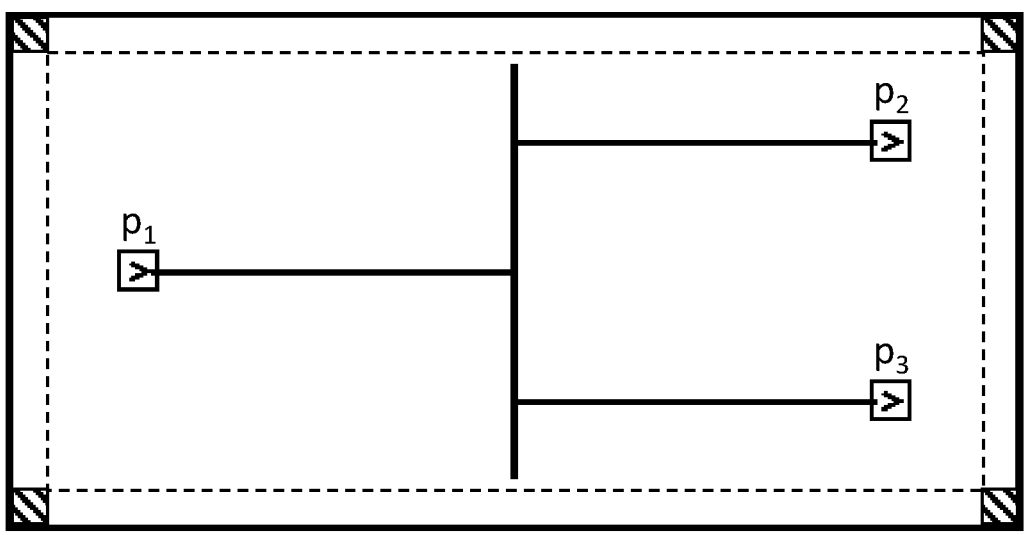
FIG. 7 is an exemplary view of a block comprising repulsive regions and border regions.

FIG. 7 comprises additional elements not present in the above figure. Four repulsive regions are shown as shaded area, one in each corner of the block. Further, dashed lines are shown in the block to indicate the inner limits of a border region. The border region comprises the area close to the upper border, right border, lower border and left border except for the cutout in the corners by the four repulsive regions.

The regions are shown for illustration purposes. In an actual graphical user interface, these regions may not be shown visually, but may indirectly determine the behavior of the graphical user interface. For instance, when a user tries to place a port in a repulsive region, the port will be immediately pushed out of that region.

Assuming a border region of fixed width has been defined, a user command for reducing the size of the block would not result in the block of FIG. 4. Instead, it would require keeping the block at a minimum size bigger than that in order to keep the ports out of the border region.

Figure 8:
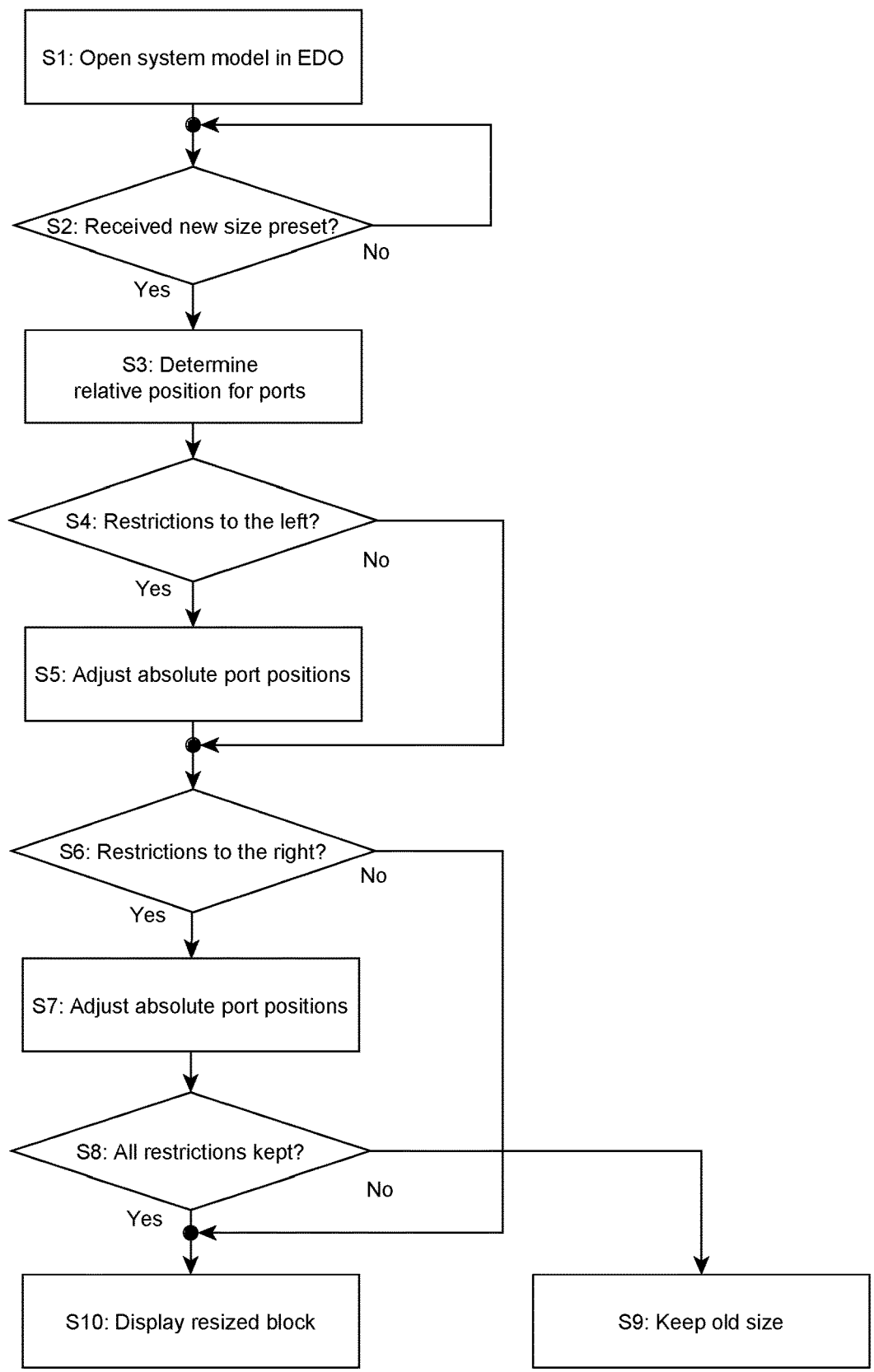
FIG. 8 is an exemplary flowchart for visualizing a block comprising ports.

FIG. 8 displays an exemplary flowchart for visualizing a block comprising ports.

In step S1 ("Open system model in EDO"), the processor opens the system model in the model editor EDO of the model management environment. For each block in the system model, relative positions of the ports in the blocks are determined. When one or more blocks have been assigned a SVG file specifying details for displaying the respective (sub-)model, opening the system model can comprises opening the SVG files.

The SVG file may comply to the "scalable vector graphics" standard format; in the following, an exemplary listing is shown:

```
<?xml version="1.0" encoding="UTF-8" standalone="no"?>
<svg
    id="Layer_1" xmlns="http://www.w3.org/2000/svg"
xmlns:xlink="http://www.w3.org/1999/xlink" x="0px" y="0px"
    version="1.1"
    viewBox="0 0 140 100" xml:space="preserve"
xmlns:mydata="http://www.myexample.com/whatever">
  <g>
    <rect
      width="140"
      height="100"
      x="0"
      y="0"
      fill="black" />
    <rect
      width="138"
      height="98"
      x="1"
      y="1"
      fill="white" />
    <line mydata:hotspot="start" x1="70" y1"10" x2="70"
y2="90" stroke="black" / >
    <line x1="20" y1="50" x2="70" y2="50" stroke="black" />
    <line x1="70" y1="25" x2="120" y2="25" stroke="black" />
    <line x1="70" y1="75" x2="120" y2="75" stroke="black" />
  </g>
</svg>
```

Generally, it would be possible to define port anchors in the SVG files specifying how to display the sub-models. Alternatively, a port anchor may be defined in the metadata describing the respective model. Different layers for describing models can be defined: In a first layer, general properties of the model type may be defined; an integration model may comprise a plurality of sub-models of this type. In a second layer, one instance of the model is specified further; this model may be used in different projects. In a third layer, the connections of this sub-model are described further; details for displaying the model can be specified in this layer. Anchor points may be a property of the model type; as a result, they need not be specified in the SVG file.

In step S2 ("Received new size preset?"), the processor determines if a user command for resizing a block has been received. Until this is the case, no further steps are carried out. The user command may be a textual command or an interaction with elements in the graphical user interface, such as selecting a corner of the block and moving the cursor to indicate the desired size. The following steps may be performed multiple times in a short timescale; this allows for a direct feedback to the user and may obviate the need to calculate a fixed minimum size for the block.

Once a new size preset has been received for a block, in step S3 ("Determine relative position for ports") the processor determines relative horizontal and vertical port positions for all ports in the chosen block. The ports can be placed one by one; as a preparation, they may be sorted from left to right and from top to bottom. The following steps including step S4 may be performed separately for each port to be placed; for simplicity, this is not shown in the exemplary flowchart. Based on the determined relative position, the processor calculates a new absolute position for each port.

In steps S4 ("Restrictions to the left?"), the processor determines if the calculated position of a port would collide with another port or the border region of the surrounding block. A collision may be determined based on verifying the distance between two ports (or the port and the border) is lower than a predetermined threshold. For instance, the predetermined threshold may be defined from the width of the surrounding box for a port.

When the distance between two ports is in fact lower than the threshold, i.e. there are overlapping ports, the processor adjusts the absolute port position in step S5 ("Adjust absolute port positions"). The port may be displaced to the right to avoid the collision; generally, the absolute position of both overlapping ports are adapted based on a predefined collision avoidance rule. By placing the ports one by one, resolving collisions between ports is simplified.

In steps S6 ("Restrictions to the right?"), the processor determines if the calculated position of a port would collide with another port or the border region of the surrounding block. A collision may be determined based on verifying the distance between two ports (or the port and the border) is lower than a predetermined threshold. For instance, the predetermined threshold may be defined from the width of the surrounding box for a port.

When the distance between two ports is in fact lower than the threshold, i.e. there are overlapping ports, the processor adjusts the absolute port position in step S7 ("Adjust absolute port positions"). The absolute position of the currently placed port or both overlapping ports may be adapted based on a predefined collision avoidance rule.

In step S8 ("All restrictions kept?"), the processor determines checks if any collision occurs for the port in the adjusted position. In case any restriction is not kept, execution continues at step S9 ("Keep old size"). Changes and adjustments to block size and port positions are discarded and the port is shown at the previous size. When all restrictions are indeed kept, execution continues at step S10 ("Display resized block"). The processor displays the block with a size given by the new size preset and with the ports at their new absolute position. Relative positions are kept as long as no collision occurs.

In the exemplary flowchart, only the checking for collisions in the horizontal direction is shown. For a robust display algorithm, potential collision in the vertical direction, i.e. restrictions to the top or bottom, should also be detected and resolved. Thus, the processor preferably carries out the corresponding steps for top and bottom. By placing ports successively and in order, only collisions between preceding and succeeding port need to be considered, limiting the amount of comparisons to be made.

Those skilled in the art will appreciate that the order of at least some of the steps of the inventive method may be changed without departing from the scope of the claimed invention. While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method for visualizing system models in a model management environment, wherein a system model comprises one or more blocks, wherein blocks comprise ports that are adapted to be placed in the area of the block, wherein ports are connected by signals, the model management environment comprising a database and a model editor, the model management environment being executed by at least one processor of a host computer, the method comprising:
    opening the system model in the model editor, wherein opening the model comprises determining a size and a position for each block and displaying each block in the model editor based on the determined size and position;
    receiving a user input for rescaling a block, wherein receiving the user input for rescaling comprises determining a new size preset;
    determining a relative horizontal position and a relative vertical position for each port in the block, the relative horizontal position being dependent upon distances of a defined point in the port, to the left border and/or the right border, and the relative vertical position being dependent upon the distance of the defined point in the port from the upper border and/or the lower border;
    calculating a new absolute horizontal and vertical position of each port in the block based on the relative horizontal and vertical position and the new size preset for the block; and
    displaying the block and each port in the block.

2. The method of claim 1, wherein at least one block is assigned at least one repulsive region or one repulsive region in each corner of the block, and wherein any port whose calculated new absolute horizontal and vertical position lies in a repulsive region is moved to the border of the repulsive region.

3. The method of claim 1, wherein at least one block is assigned a border region, the border region comprising an area up to a defined distance from the border of a block, and wherein for any port located in the border region, the absolute distance to the closest border is kept fixed.

4. The method of claim 3, wherein the distance defining the border region is kept fixed irrespective of block size, and wherein for a block comprising a border region, any port not located in the border region is kept out of the border region after rescaling.

5. The method of claim 1, further comprising defining a minimum size for the block, and keeping the size of the block at or above the minimum size when rescaling.

6. The method of claim 1, wherein two adjacent ports are kept from overlapping by determining if the distance between two adjacent ports would fall below a predefined minimum value after rescaling, and in that case adjusting the absolute positions while storing the determined relative positions for a possible future rescaling.

7. The method of claim 1, wherein model visualization presets, such as size presets for the blocks, are stored in files, and wherein features important for displaying the model are stored in the file as additional elements or tags.

8. The method of claim 7, wherein a predefined snap-in position is defined for inserting a new port or changing the position of an existing port.

9. The method of claim 8, wherein a graphical element, such as a point or a rectangle, is defined as a port anchor, and wherein the snap-in position is at a predefined distance from the port anchor.

10. The method of claim 7, wherein information areas are defined in the file, and wherein additional information are displayed to the user when a pointer is positioned in the information area of the model displayed in the model editor.

11. A computer system comprising at least one host computer, the at least one host computer comprising a processor, a random access memory, a graphics controller connected to a display, a serial interface connected to at least one human input device, and a nonvolatile memory, the nonvolatile memory comprising instructions that, when executed by the processor, cause the host computer to carry out the method according to claim 1.

12. A non-transitory computer readable medium containing instructions that, when executed by a processor of a computer system, cause the computer system to carry out the method according to claim 1.

13. The method of claim 1, wherein the defined point in the port includes a center or a top left corner.

* * * * *